United States Patent [19]

Cole, Jr.

[11] Patent Number: 4,896,158

[45] Date of Patent: Jan. 23, 1990

[54] BEACON FRUIT FILTER

[75] Inventor: Elbert L. Cole, Jr., Catonsville, Md.

[73] Assignee: Westinghouse Electric Corp., Pittsburgh, Pa.

[21] Appl. No.: 266,813

[22] Filed: Nov. 3, 1988

[51] Int. Cl.⁴ ............................................. G01S 13/78
[52] U.S. Cl. ...................................................... 342/40
[58] Field of Search ........................................... 342/40

[56] References Cited

U.S. PATENT DOCUMENTS

| 3,258,772 | 6/1966 | Humpherys | 342/40 |
| 3,302,197 | 1/1967 | Humpherys | 342/40 |
| 3,514,707 | 5/1970 | Campanaro et al. | 342/40 |
| 3,900,848 | 8/1975 | Mears | 342/40 X |

Primary Examiner—Thomas H. Tarcza
Assistant Examiner—Gilberto Barrón, Jr.

[57] ABSTRACT

A method and apparatus for prefiltering received target and fruit replies to filter out more obvious occurrences of fruit replies in an air traffic control system. A detector detects reply signals occurring during sweeps of a radar. After each sweep of the radar, the sweep interval is scanned for the occurrences of reply signals. If a received reply is repeated in any of a predetermined number of successive sweep intervals, then standard sequential observer detection is performed on a larger predetermined number of beam sweeps. If, however, the received reply is not repeated in any of the beam sweeps of the first window, then the signal is considered to be a fruit signal and is discarded.

9 Claims, 10 Drawing Sheets

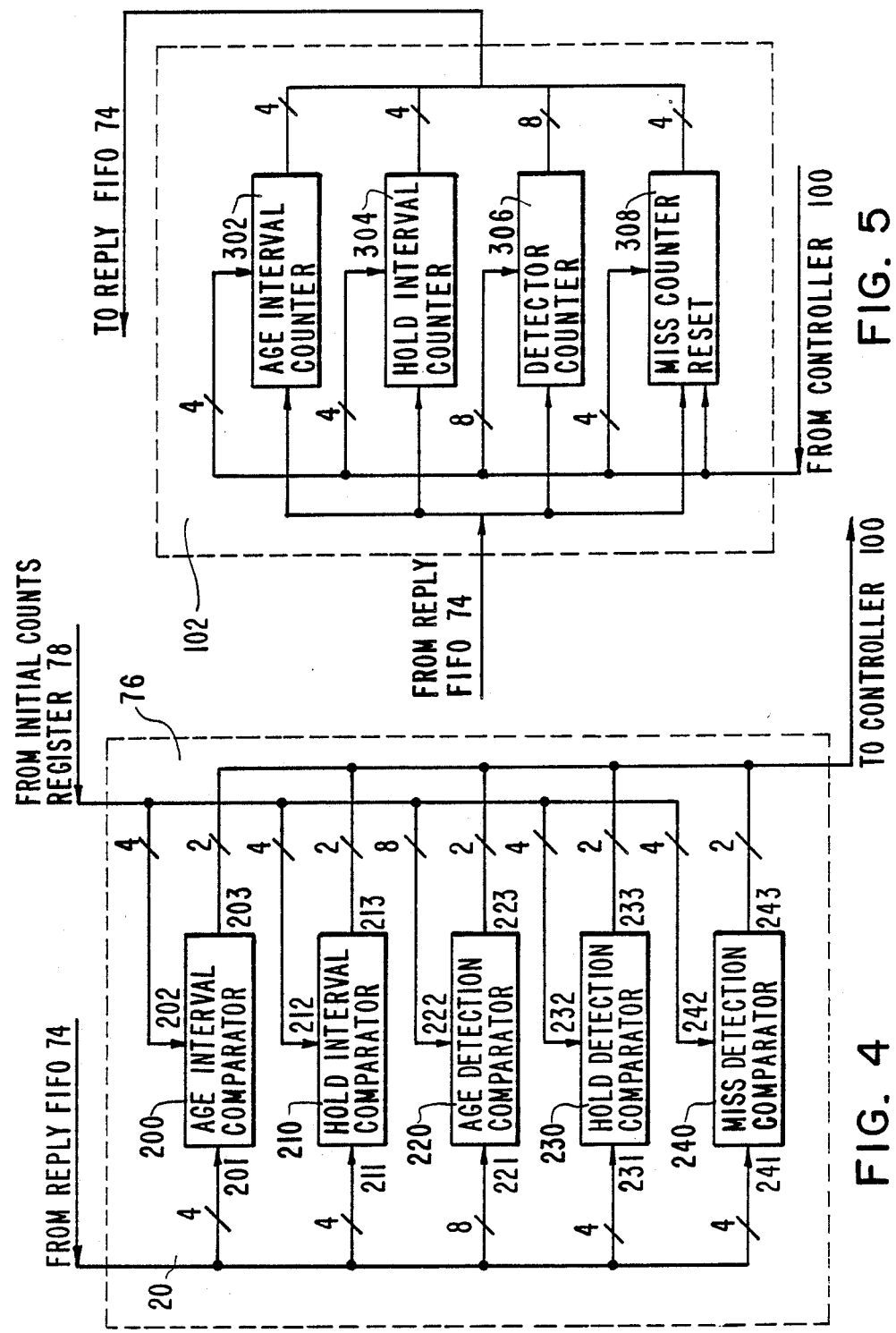

BEACON FRUIT FILTER

BACKGROUND OF THE INVENTION

1. Field of the Invention

The present invention is related to a system for filtering out unsolicited reply signals in Air Traffic Control (ATC) systems, and, more particularly, to a system for pre-filtering received target and fruit replies to filter out more obvious occurrences of fruit in the Air Traffic Control Radar Beacon System (ATCRBS).

2. Description of the Related Art

The Air Traffic Control Radar Beacon System (ATCRBS) has become an important source of surveillance information for Air Traffic Control (ATC), pre-empting "search radar". ATCRBS is an active system, whereby a ground based radar (interrogator) interrogates aircraft within its surveillance area for identity and altitude information Each sweep of the radar defines a receiving interval known as a Pulse Repetition Time (PRT). The aircraft responds by sending back a pulse train containing its assigned identity (Mode 3/A) or its flight level altitude (Mode C). These responses are known as beacon replies.

The ATCRBS is subject to a form of interference known as "fruit". Aircraft within range of the ATCRBS are not discretely addressed and there are often many interrogators within range of the aircraft. A reply received by the same interrogator that solicited the reply is called a target reply. A reply received by a first interrogator that was solicited by a second interrogator is defined as a fruit reply. Interrogators in close proximity to each other are operated asynchronously and often have differing Pulse Response Frequencies (PRFs) to help detect the fruit replies. The greater the number of aircraft and the number of interrogators, the more severe the fruit problem becomes. Fruit replies cause a form of interference with target replies known as garbling, and generally degrade the ability to detect and accurately locate ATCRBS equipped aircraft in an assigned surveillance area.

The advent of software oriented ATCRBS processing techniques has improved the beacon system capability in supplying surveillance data. With these techniques, the target replies are processed along with the fruit replies.

Fruit elimination processing (known as "defruiting") methods are known. Pulse-by-pulse defruiting involves filtering of individual video pulses of replies prior to decoding of the replies. Bracket defruiting involves filtering decoded replies. Both methods employ a comparison technique known as sequential observing, whereby a reply from an interrogation signal received in a first PRT interval (n) is compared to a reply from the interrogation signal received in a second PRT interval (n+j), where j represents the mode repeat interval. Since fruit is asynchronous, it will not usually repeat in the same time slot in subsequent PRT intervals on an interrogation-to-interrogation basis. A comparison of the replies received in adjacent intervals identifies the fruit replies.

These methods severely degrade the ATCRBS in areas in which moderate to high fruit rates occur. They are used, however, to lower the amount of data being processed by the software algorithms of the ATCRBS. Probability of detection of the fruit replies is lowered by miss multiplication (a true reply (n) followed by no reply (n+j) for a target signal). Azimuth accuracy is degraded by the loss of leading and trailing replies in azimuth as the antenna of the ATCRBS scans a given surveillance area.

Known beacon reply processing systems incorporate defruiting (using sophisticated algorithms) as an integral part of a sequential observer detection scheme. A sequential observer utilizes an "M of N" detector. The M of N detector has a pre-established threshold level (M) of received replies and a pre-established number (N) of PRT intervals over which the received reply signals are compared. For example, if the threshold level M is set to 6 and N=20 PRT intervals, then the M of N detector will count the number of replies received for a particular range position over 20 PRT intervals. If 6 or less are received, then the M of N detector indicates that the replies are fruit replies, and discards them. If more than 6 replies are received, the M of N detector sends them along to be processed by the ATC system. Fruit replies rarely occur M times within N PRT intervals, since they are asynchronous. A large quantity of fruit makes it difficult to economically provide the needed computing hardware to implement these sophisticated algorithms, since fruit elimination processing can consume nearly 50% of the provided processing capability needed to handle a typical surveillance area.

Surveillance areas having densities of 10,000 fruit replies per second can be adequately accommodated by modern computer technology. However, beyond this density value, the ability to efficiently and correctly process the surveillance area becomes limited. Fruit rates of up to 10,000 per second are typical at large airports (Los Angeles and New York) for terminal radars (60 nautical mile coverage) such as the Westinghouse radar system ASR-9. Fruit rates of up to 40,000 per second are typically encountered in the en-route series of radars (250 nautical mile coverage) both in the U.S. and Europe.

Ordinary computer systems are not fast enough to handle this high volume of processing. Large scale computing resources are prohibitively expensive for this application, even with multiprocessing capability, because of the large amounts of computing power needed to deal with high fruit rates.

SUMMARY OF THE INVENTION

An object of the present invention is to provide a system for filtering out unsolicited reply signals occurring in an Air Traffic Control (ATC) system.

Another object of the present invention is to provide a pre-filter which receives both target and fruit replies and filters out obvious occurrences of fruit.

A further object of the present invention is to provide a pre-filter system which receives both target and fruit replies and filters out obvious occurrences of fruit while having a minimal impact on the probability of detecting a desired target reply, as well as not affecting the positional accuracy of the target.

The above objects are obtained by the system herein disclosed by which a pre-filter filters out single occurrences of fruit detected in a first window of PRT intervals. According to the present invention, there is provided a pre-filter for removing fruit replies from decoded reply data prior to being output for processing in a radar system, comprising detecting means for detecting reply signals occurring in a plurality of time periods; counting means for counting a number of related reply signals occurring in a first predetermined number of said time periods and for counting a number of related reply signals occurring in a second predetermined number of said time periods, said second predetermined number being greater than said first predetermined number; memory means for storing the reply signals detected by said detecting means; comparing means for comparing the number of related reply signals occurring in said first predetermined number of said time periods with a first threshold value and for comparing the number of related reply signals occurring in said second predetermined number of said time periods with a second threshold value; and control means for controlling the output of said pre-filter, whereby: a reply signal stored in said memory means is discarded when a number of related replies occurring in said first predetermined number of time periods is below said first threshold value; related reply signals stored in said memory means are output from said pre-filter when a number of related reply signals occurring in said first predetermined number of time periods is equal to or greater than said first threshold value; related replies stored in said memory means are discarded when a number of related replies occurring in said second predetermined number of time periods is below a second threshold value; and related replies stored in said memory means are output from said pre-filter when a number of related replies occurring in said second predetermined number of time periods is equal to or greater than said second threshold value.

BRIEF DESCRIPTION OF THE DRAWINGS

FIG. 4 is a block diagram of the count evaluation means of FIG. 3;

FIG. 5 is a block diagram of the count aging means of FIG. 3.

DESCRIPTION OF THE PREFERRED EMBODIMENTS

Figure 1:
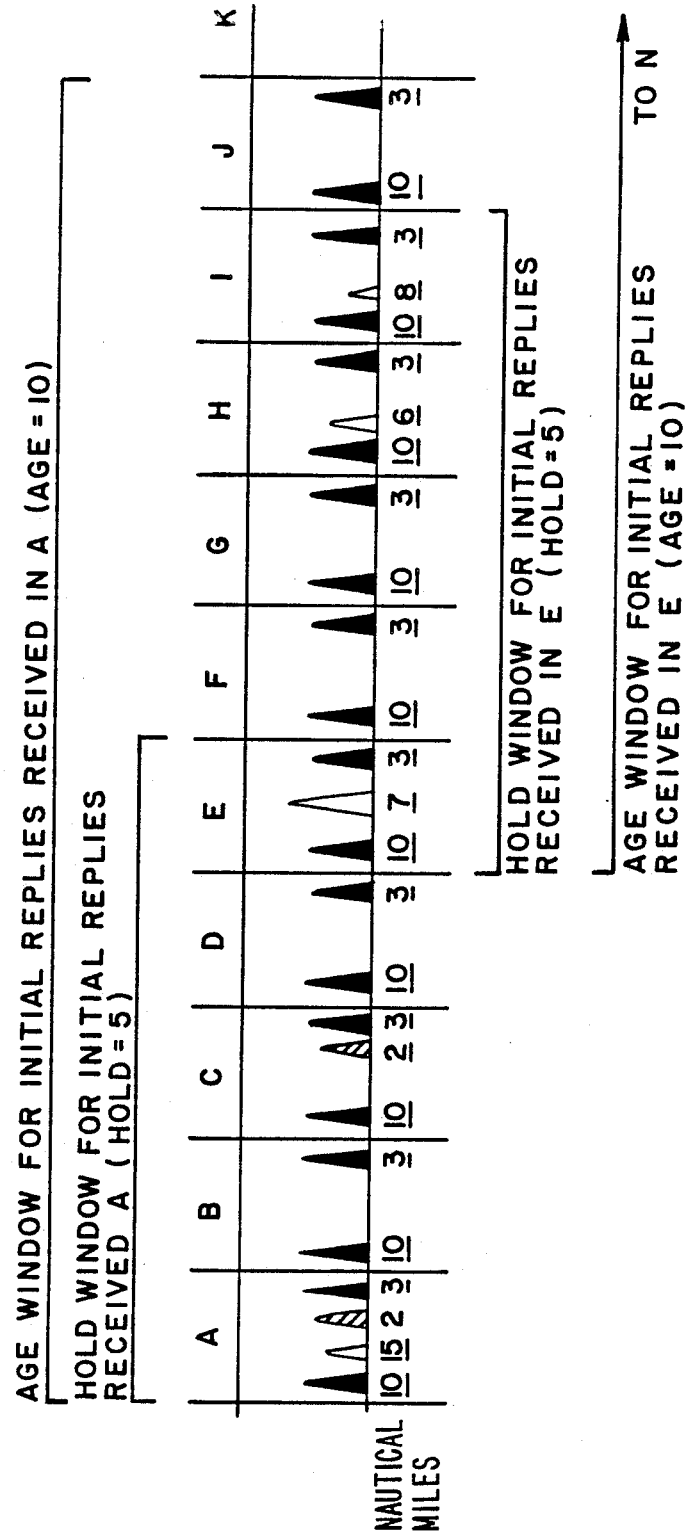
FIG 1 is a graph showing examples of HOLD and AGE windows for describing the operation of the present invention.

Referring to FIG. 1, a series of ten PRT intervals A-J are shown. This group of ten PRT intervals is called an AGE window. While the AGE window shown in FIG. 1 has an "AGE" value of 10 (equal to the number of PRT intervals), the AGE value can be from 8-16, with 11 being optimum. Typically, in a ten interval AGE window (AGE=10), 70% of the fruit reply signals received would have only one occurrence within this window. This is determined for a fruit rate of 40,000 per second and a range acceptance interval of approximately 1.0 microseconds. The range acceptance interval is "margin of error" window which allows a reply to be correlated to a reply in a subsequent PRT interval if it occurs within approximately 1.0 microsecond (0.5 microseconds on either side) of the initial reply. In the PRT interval A of FIG. 1, four replies are shown, the first being received from a range position of 2 nautical miles, the second being received from a range position of 3 nautical miles, the third being received from a range position of 10 nautical miles and the fourth being received from a range position of 15 nautical miles. In an actual PRT interval, the number of replies could typically be much greater, e.g., 65, with the majority of them being fruit replies. Replies received in the remaining PRT intervals B-J, along with the range position from which they were received, are also shown.

Processing of the signals over the age window A-J will result in the detection of the fruit replies, since they are asynchronous and "stand out" from the synchronous target replies. However, to shorten the processing time and to reduce the amount of memory required, a shorter group of PRT intervals, called a HOLD window, is inspected. The HOLD window is merely a portion of the AGE window. In the example shown in FIG. 1, the HOLD window has a "HOLD value" of 5 (HOLD=5). The HOLD value can ideally be anywhere from 0-7, with 5 being the optimum.

Within the HOLD window, the received signals are inspected to see if there is a correlation between any of the replies (i.e., do any of the replies in interval A recur at the same range position in intervals B-E), taking into account the range acceptance interval. If, after completion of the HOLD window, a single uncorrelated reply is detected, it is regarded as a fruit reply and is immediately discarded from the system. A HOLD detection threshold in this example is 2 (2 correlated occurrences). Since the HOLD detection threshold was not met, the reply is discarded as fruit. This allows the fruit to be eliminated faster than if the entire AGE window were inspected prior to discarding the fruit. In the example shown in FIG. 1, the replies received at 2 nautical miles and 15 nautical miles in interval A are also received in all subsequent intervals B-J. Obviously, these replies are target replies. Also in interval A, however, a reply signal was received from a range position of 3 nautical miles. Since, for example, the HOLD window has a HOLD value of 5, the next four intervals are inspected to look for a second occurrence of the 15 nautical mile reply. As can be seen, no further occurrences of the 3 nautical mile reply in intervals B-E were received. Accordingly, the system regards this signal as a fruit reply and does not look any further for second occurrences of the 3 nautical mile reply within the AGE window A-J.

To avoid discarding true signals, however, if two or more related replies are detected prior to the end of the HOLD window (assuming a HOLD detection threshold of 2), the system reverts back to inspecting the AGE window, looking for M occurrences of the reply. M is the detection threshold value for the AGE window (the AGE detection threshold), which ideally can be from 2-8 detections, with 4 being optimum.

When a second correlated reply occurs in the HOLD window thus meeting the HOLD detection threshold of 2, an enabling gate in the hardware is opened to allow all future correlated replies to be passed to the data processor, where the M of N processing takes place. Thus, in FIG. 1, after interval B, the enabling gate would pass all future replies correlated to the 2 and 15 nautical mile replies without analysis. Likewise, the 10 nautical mile reply would be forwarded through the pre-filter at point C.

When a second correlated reply is received, the initial and second reply data is passed to the software of the ATC system for processing. This reply data includes azimuth, range, code and mode data for both replies. The pre-filtered replies, now much smaller in number than before the pre-filtering process, are subject to standard M of N detection. If, at the end of the AGE window, less than M (the AGE detection threshold) replies have been received, then the enabling gate is closed and all information is discarded. This indicates a probable fruit occurrence; a message will be sent to the software denoting the destruction of the window.

If the condition in which M or more replies have been received within the AGE window occurs, then the replies are regarded as target replies. The enabling gate will be held open until P successive "misses" occur. P is a termination or MISS threshold, which when reached, signals an end to the processing of a target reply. A "miss" is defined as the lack of a reply at a given range position in a PRT interval. Ideally, the MISS threshold can be between 4 and 11 successive misses, 7 being optimum.

Each initial reply has its own HOLD and AGE windows. For example, in FIG. 1, Interval E, an initial reply is shown at a range position of 7 nautical miles. The HOLD and AGE windows for this initial reply will extend from interval E to interval I, and interval E to interval N, respectively.

Since range proximity is used as the correlation criteria, the correlation windows are to be stored in a range ordered manner to facilitate the comparison process. Overlapped range gates are allowed and, when an overlap occurs, both remain active until both meet the successive miss threshold (P).

Figure 2:
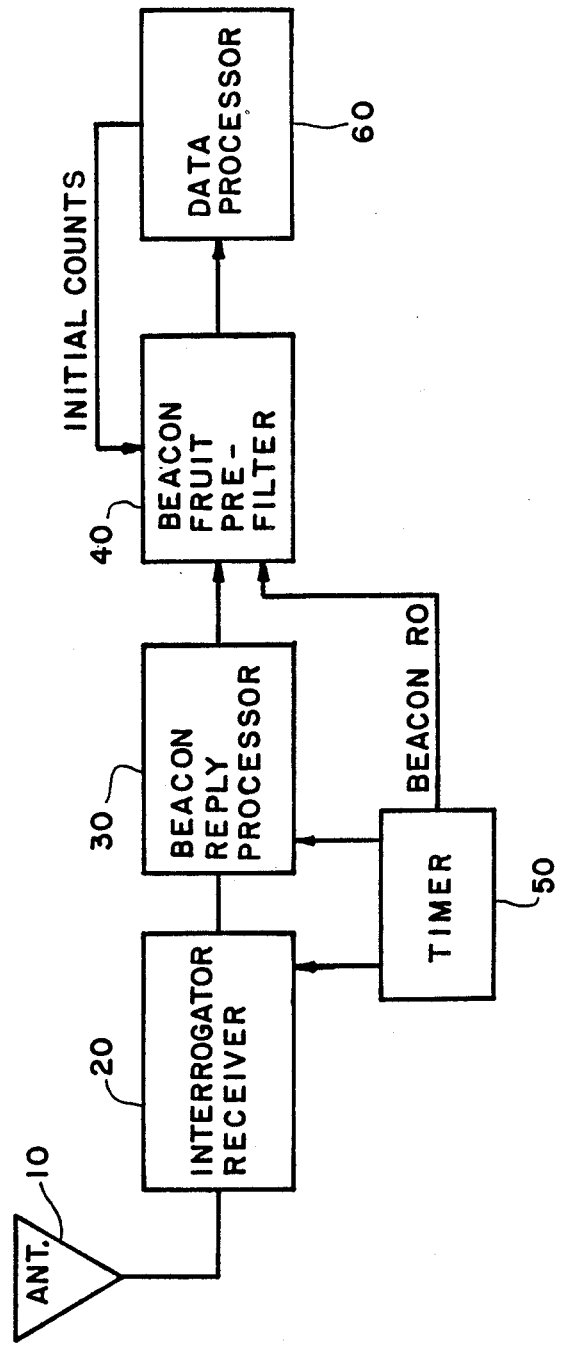
FIG. 2 is a block diagram of an ATCRBS including the beacon fruit prefilter of the present invention.

FIG. 2 is a block diagram of an ATCRBS utilizing the pre-filter of the present invention. An antenna 10 receives radio frequency signals which are input into an interrogator receiver 20. Video signals are output from the interrogator receiver 20 into a beacon reply processor 30. The beacon reply processor 30 extracts all reply signals from the video signal, including target replies and fruit replies. This decoded reply data is input to a beacon fruit pre-filter 40 comprising the present invention. A timer 50 coordinates the transmission and receiving sequences of the interrogator receiver 20, the beacon reply processor 30 and the beacon fruit pre-filter 40. Timer 50 also outputs a beacon RO to beacon fruit pre-filter 40. The beacon RO is a signal sent each time the antenna 10 begins to receive a sweep of RF signals. In the beacon fruit pre-filter 40, the decoded reply data is pre-filtered as previously described, and the pre-filtered signal is output to a data processor 60. Initial counts are fed back from the data processor 60 to the beacon fruit pre-filter 40 for correlation processing.

Figure 3:
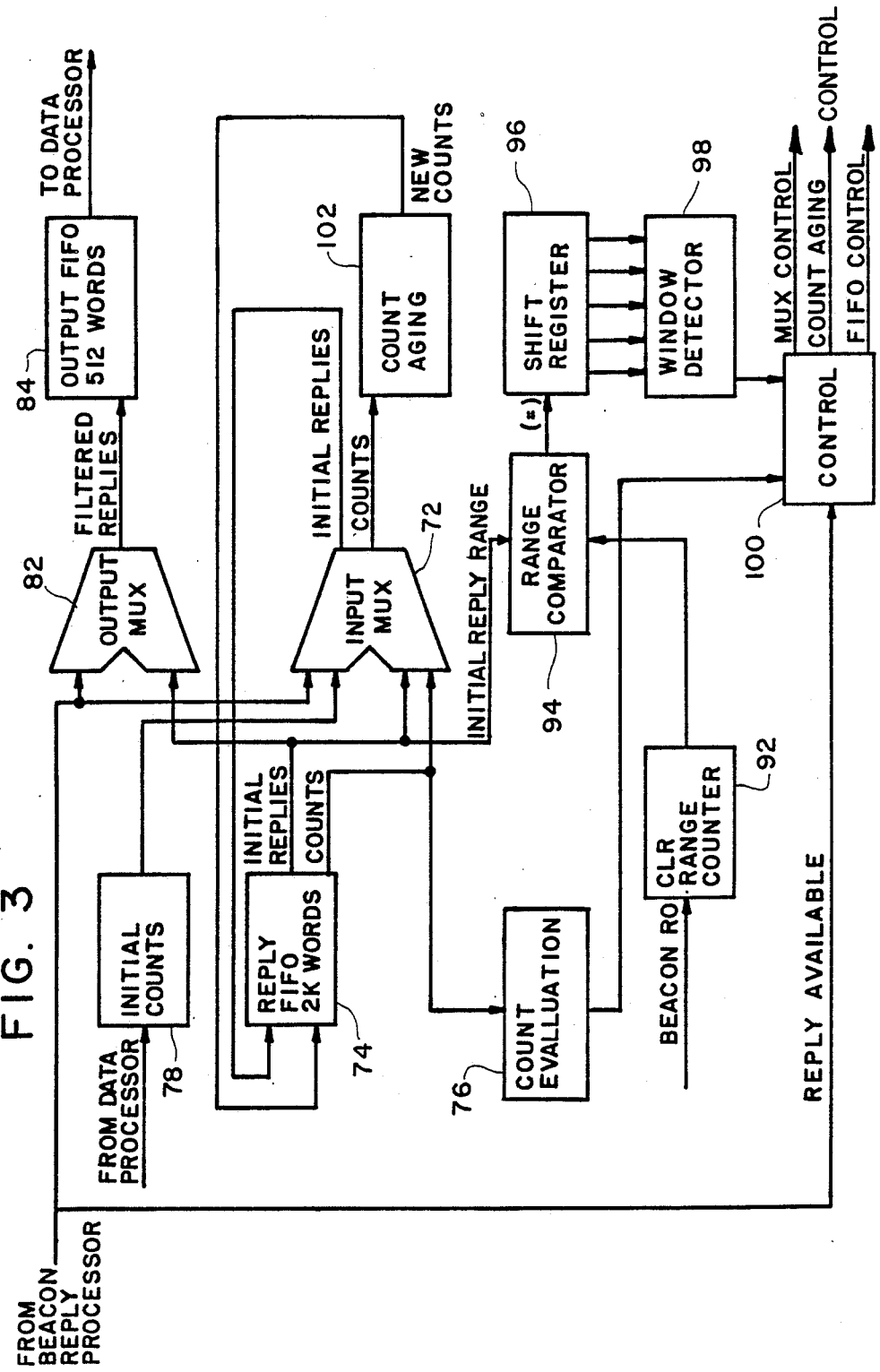
FIG. 3 is a block diagram of the beacon fruit prefilter of the present invention.
Figure 6:
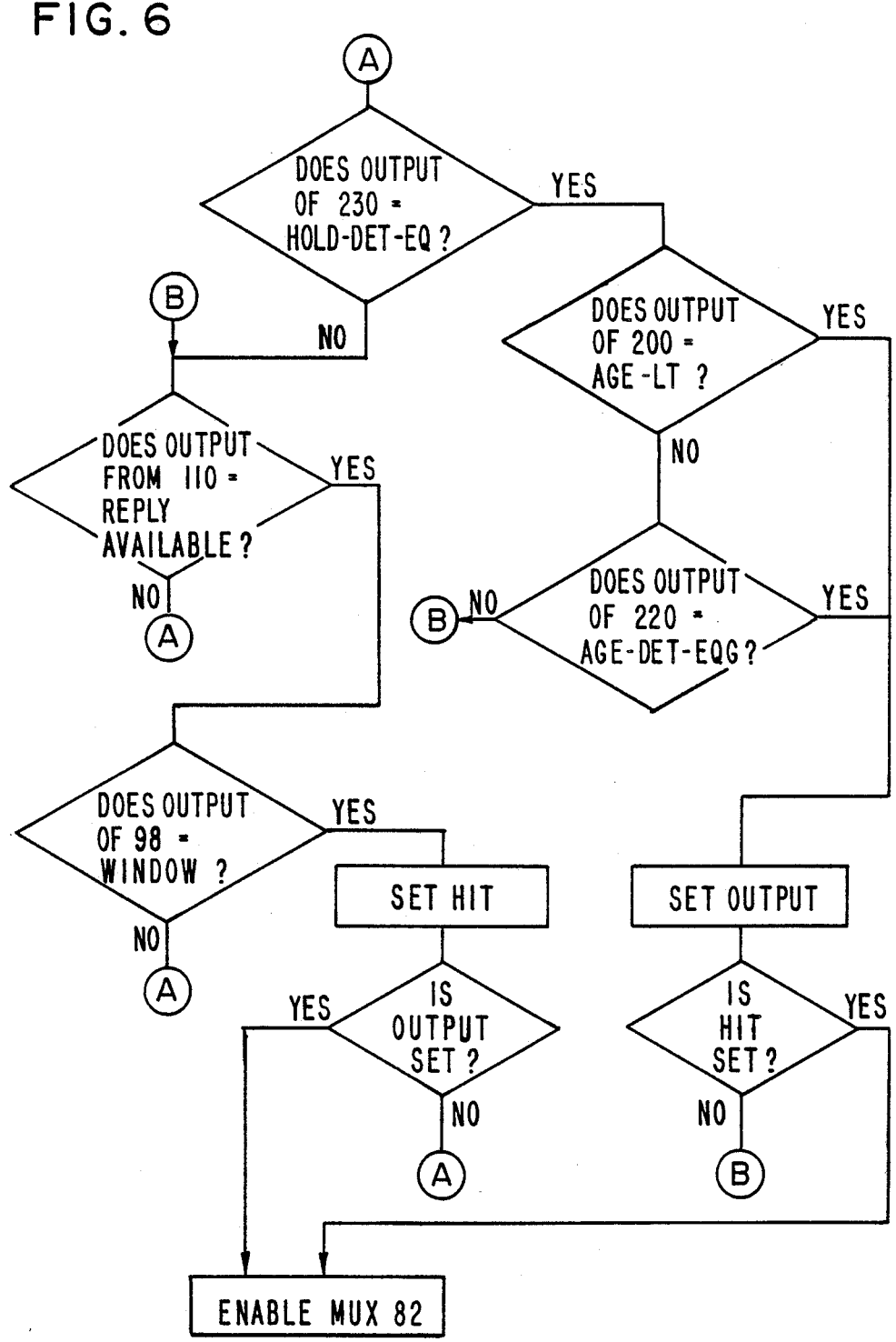
FIGS. 6-14 are flowcharts illustrating one of controller 100 of FIG. 3.
Figure 7:
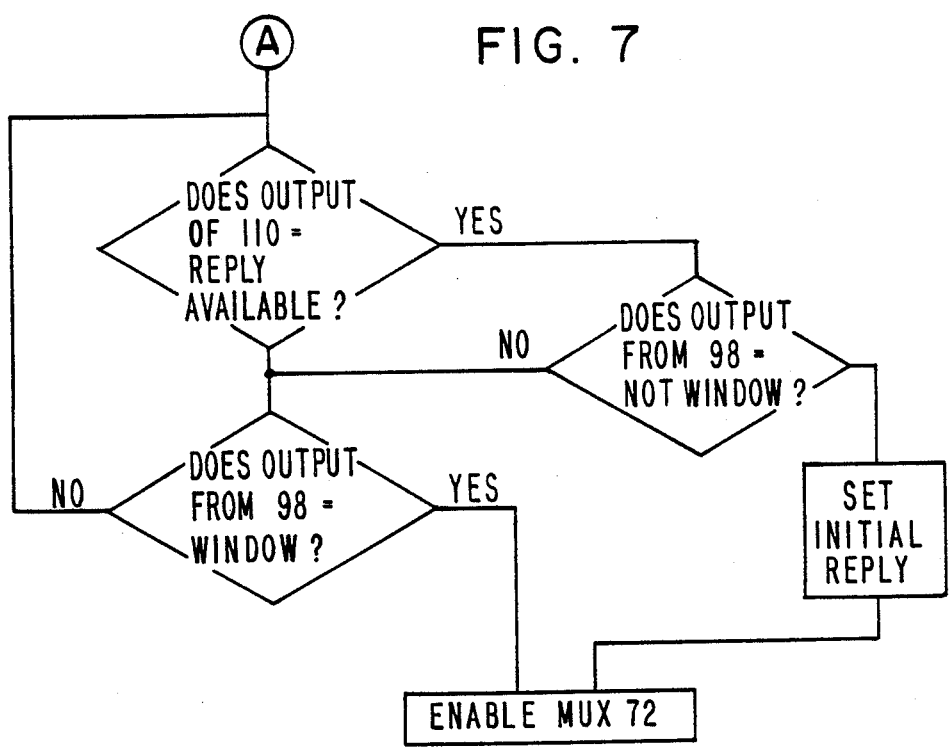
Figure 8:
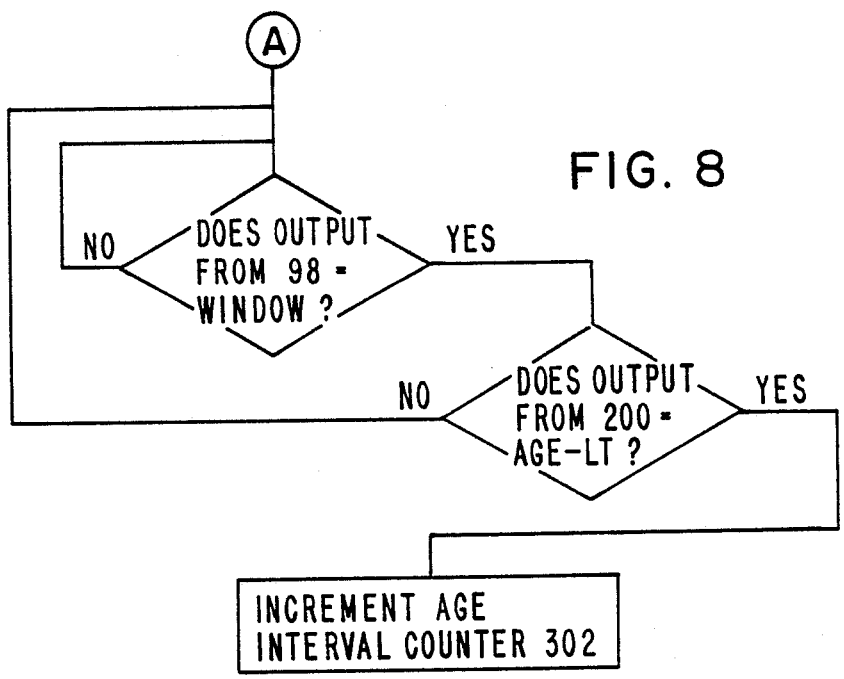
Figure 9:
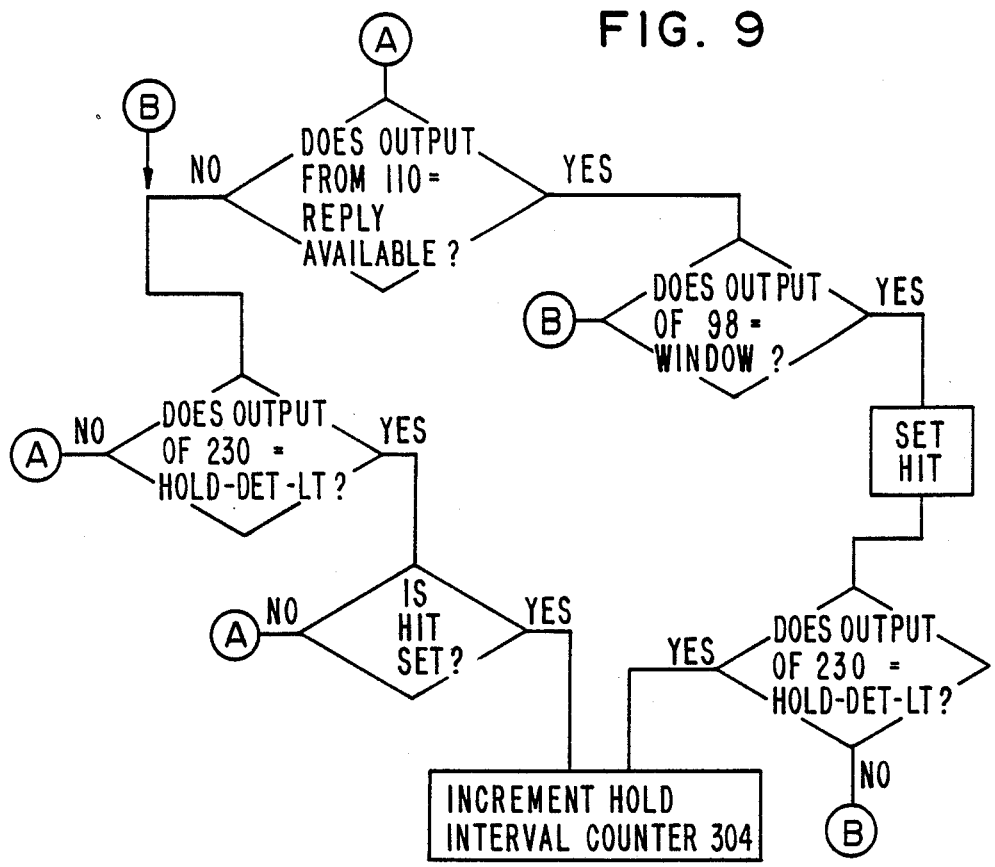
Figure 10:
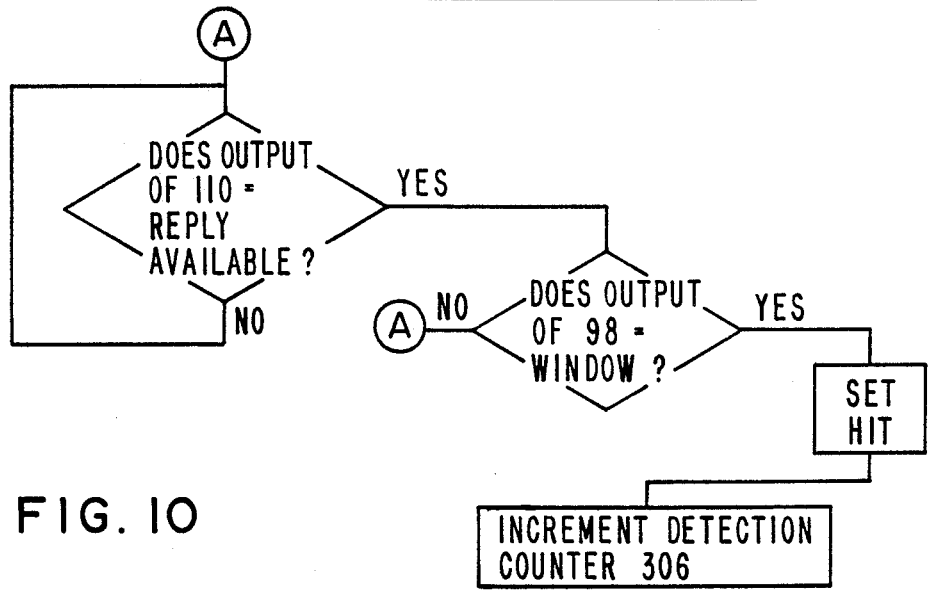
Figure 11:
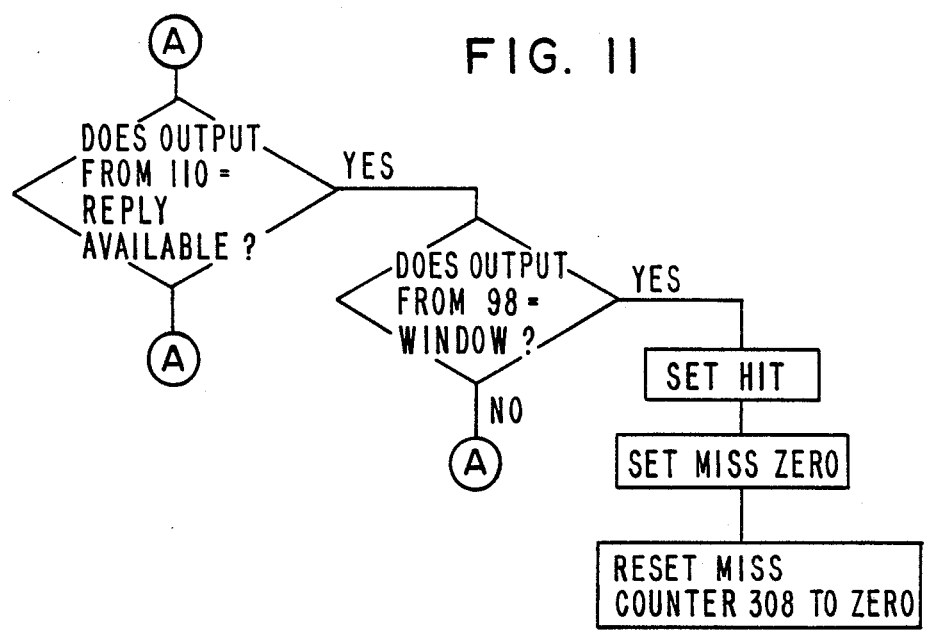
Figure 12:
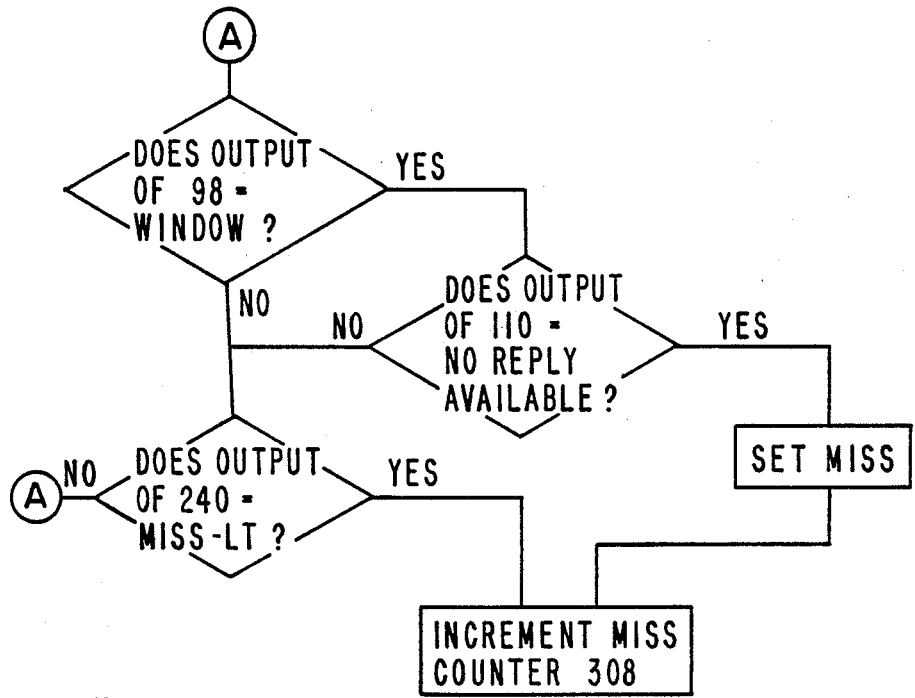
Figure 13:
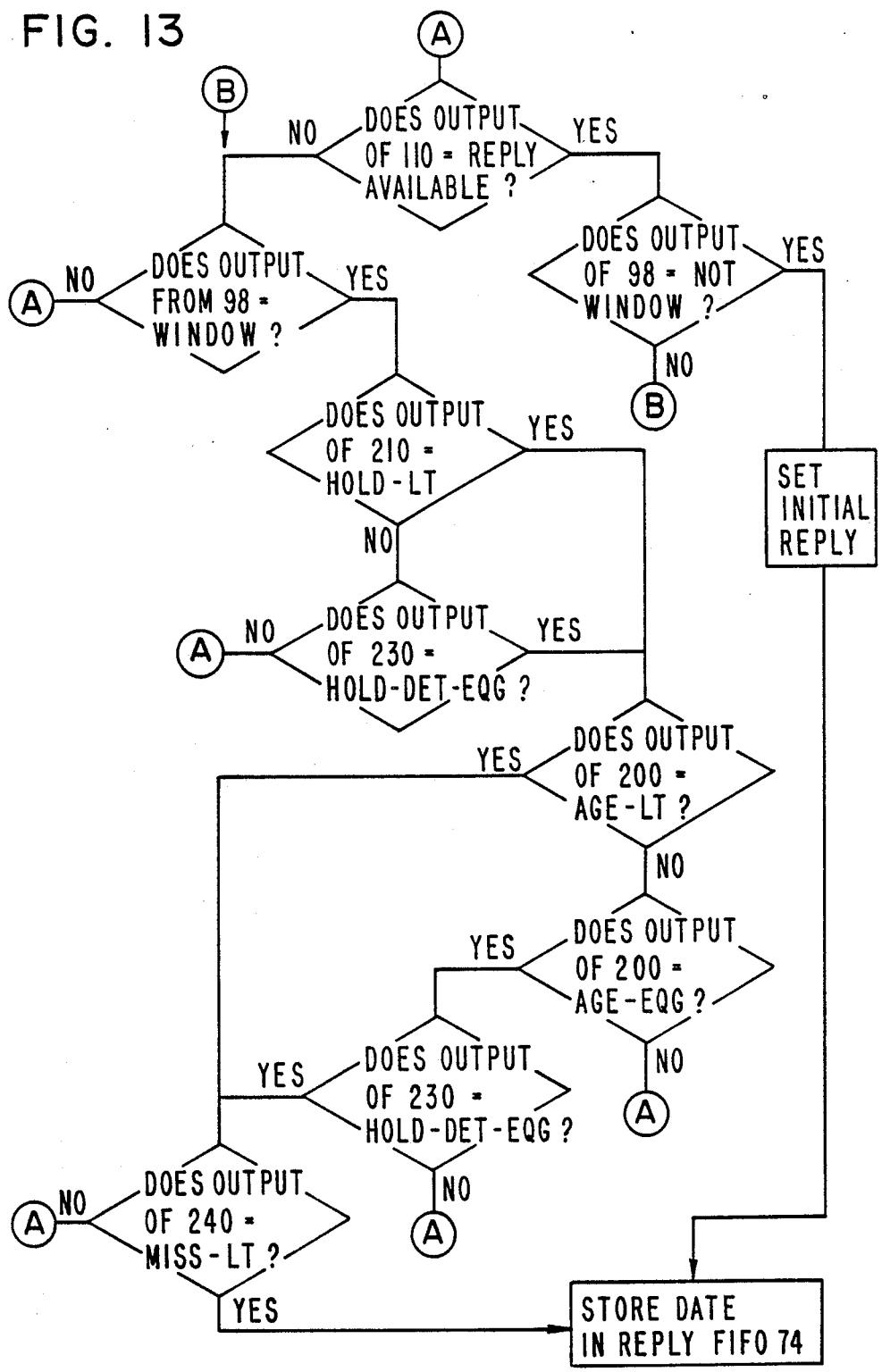
Figure 14:
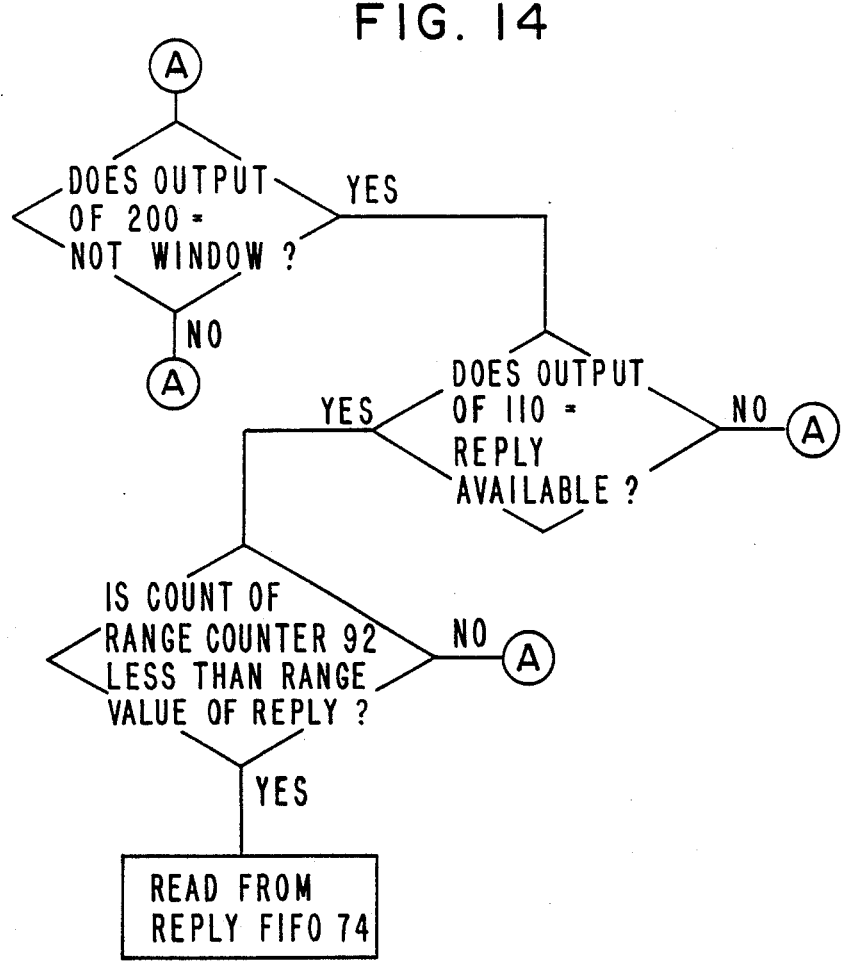

FIG. 3 is a block diagram of the beacon fruit pre-filter 40. Beacon fruit pre-filter 40 receives decoded reply data from beacon reply processor 30. Replies received from beacon reply processor 30 are called "new" replies. "Initial" replies are those which have been previously received and which have been determined to not correlate with any other replies. The decoded reply data includes information concerning the identity of the aircraft or its altitude, the angle or bearing, and the range at which the reply signal was detected (range position data).

A range counter 92 increments values indicative of range positions, from 0 up to the range of the radar (e.g., 0–250 nautical miles). Each new sweep of the radar sends a beacon RO from timer 50 to the range counter 92, which resets range counter 92 to zero. The incrementing count from range counter 92 is supplied to a range comparator 94 for matching with range position data of initial replies stored in reply memory 74.

The decoded reply data from beacon reply processor 30 (FIG. 2) is input to reply detector 110, which outputs a REPLY AVAILABLE (e.g., a logic "1") or a NO REPLY AVAILABLE (e.g., a logic "0") signal, if a reply is or is not detected, respectively from the decoded reply data. Once each PRT interval, all initial replies stored in reply memory 74 are dumped into range comparator 94. Upon receipt of a beacon RO, range counter 92 goes through its counting cycle. When the range position data of the initial replies dumped from reply memory 74 matches the range count of the range counter (for example, 2 nautical miles as shown in FIG. 1), any initial reply corresponding to the 10 nautical mile range enables the shift register 96. Shift register 96 sets up the range acceptance interval providing the approximately 1.0 microsecond window for correlation. The actual reply available is output at the center of shift register 96 with values on either side of the actual reply being output of the shift register outputs before and after the center output setting up the window. The output of shift register 96 is supplied to a window detector 98. Window detector 98 can be an OR gate that outputs a WINDOW signal (e.g., a logic "1") to controller 100 indicating that a reply was received within the window created by shift register 96. This signal is output whenever any of the outputs from shift register 96 is, for example, a logic "1".

FIG. 4 illustrates count evaluation means 76. Count evaluation means 76 comprises a series of comparators. An AGE interval comparator 200 is coupled via input 201 to reply FIFO 74, and via input 202 to initial count registers 78. AGE interval comparator 200 receives the AGE interval count values stored in reply FIFO 74 and compares them with the AGE interval threshold value stored in initial count register 78. If the AGE interval count value is less than the AGE interval threshold value, AGE interval comparator 200 outputs a signal AGE-LT (e.g., a logic "zero"). If the AGE interval count value is greater than or equal to the AGE interval threshold value, AGE interval comparator 200 outputs a signal AGE-EQG (e.g., a logic "1"). The remaining comparators comprising count evaluation means 76 operate in a similar manner. A HOLD interval comparator 210 receives the hold interval count value stored in reply FIFO 74 via input 211. Actually, the HOLD interval count value and AGE interval count value are the same, and are just input into different comparators for comparing to different values. HOLD interval comparator 210 also receives the HOLD interval threshold value from initial count register 78 via input 212. If the HOLD interval count value is less than the HOLD interval threshold value, the HOLD interval comparator 210 outputs a signal HOLD-LT, and if the HOLD interval count value is equal to the HOLD interval threshold value, the HOLD interval comparator 210 outputs a signal HOLD-EQG.

An AGE detection comparator 220 compares a stored count value (the AGE count detection value from reply FIFO 74) with the AGE detection threshold value stored in initial counts register 78. If the AGE count detection value is less than the AGE detection threshold value, a signal AGE-DET-LT is output, and if the AGE count detection value is greater than or equal to the AGE detection threshold value, a signal AGE-DET-EQG is output.

A HOLD detection comparator 230 compares the HOLD detection count value with the HOLD detection threshold value, and outputs a signal HOLD-DET-LT if the HOLD count detection value is less than the HOLD detection threshold value, and a signal HOLD- DET-EQG if it is equal to or greater than the hold detection threshold value.

A MISS detection comparator 240 compares the MISS count detection value with the MISS count threshold value. If the MISS count detection value is less than the MISS count threshold value, the MISS detection comparator 240 outputs a signal MISS-LT, and if it equals the MISS count threshold value, the MISS detection comparator 240 outputs a signal MISS-EQ. All of the outputs from count evaluation means 76 (AGE-LT, AGE-EQG, HOLD-LT, HOLD-EQ, AGE-DET-LT, AGE-DET-EQT, HOLD-DET-LT, HOLD-DET-EQG, MISS-LT and MISS-EQ) are input to controller 100.

The output from window detector 98 is also output to controller 100. If window detector 98 detects a reply in the window defined by shift register 96, a WINDOW signal is output (e.g., a logical "1"). If no reply exists in the shift register 96, a NOTWINDOW (e.g., a logic "0") is output to controller 100.

Controller 100 also receives a signal from reply detector 110. If a reply is included in the decoded reply data from beacon reply processor 30, the reply detector outputs a signal REPLY AVAILABLE (e.g., a logic "1"). If no reply is detected, a signal NO REPLY is output from reply detector 110 (e.g., a logic "0").

All of the signals output from count evaluation means 76, window detector 98 and reply detector 110 are processed by controller 100. Controller 100 comprises a logic controller, for example a discrete boolean logic device, a complex gate array, a PLA, or a microprocessor.

Controller 100 controls input multiplexer 72 and output multiplexer 82 via mux control lines 104 and 106. Mux control line 104 is input to input multiplexer 72, and mux control line 106 is input to output multiplexer 82.

Multiplexer 82 is enabled upon receipt of an ENABLE signal from controller 100. For the ENABLE signal to be sent, two conditions, OUTPUT and HIT must occur in controller 100. OUTPUT occurs when controller 100 receives the signal HOLD-DET-EQG and either AGE-LT or AGE-DET-EQG. HIT occurs when controller 100 receives a REPLY AVAILABLE from reply detector 110 and a simultaneous WINDOW from window detector 98. The simultaneous occurrence of OUTPUT and HIT enables output mux multiplexer 82.

For input multiplexer 72 to be enabled, controller 100 must receive a REPLY AVAILABLE simultaneously with a NOT WINDOW (this combination is called an INITIAL REPLY) or a WINDOW signal by itself. If either of these occurs, input multiplexer 72 is enabled.

Controller 100 also controls the count aging circuit 102 to properly increment the various counts stored by the counters of count aging circuit 102. FIG. 5 illustrates count aging circuit 102. An AGE interval counter 302 receives a stored interval count stored in reply FIFO 74 via input multiplexer 72. If controller 100 receives WINDOW and AGE-LT simultaneously, an AGE INTERVAL INCREMENT signal is input to interval counter 302, which increments the stored interval count (by, or example, 1) and outputs it to reply FIFO 74 as an updated interval count, where it is again stored. In this manner, the interval count is incremented until it reaches or exceeds either the hold or AGE interval threshold values.

A HOLD interval counter 304 receives a stored HOLD interval count from reply FIFO 74. If controller 100 receives a HIT and HOLD-DET-LT simultaneously, it outputs a HOLD INTERVAL INCREMENT signal to HOLD counter 304 to increment the stored HOLD count, outputting the incremented value as an updated HOLD interval count.

A detection counter 306 receives a stored detection count from reply FIFO 74. If controller 100 receives a HIT signal, it outputs a DETECTION INCREMENT to detection counter 306 to increment the stored detection count, outputting the incremented value as an updated detection count.

A MISS counter 308 receives a stored MISS count from reply FIFO 74. If controller 100 receives a HIT signal, it outputs a MISS ZERO to MISS counter 308 to reset the counter to zero. If controller 100 receives a WINDOW simultaneously with a NO REPLY AVAILABLE (this combination is called a MISS) and a MISS-LT signal, it outputs a MISS INCREMENT. Thus, counter 308 will count successive "misses".

Controller 100 also controls the storing or reading of information into or out of FIFO 74. FIFO 74 will store incoming data if it receives INITIAL REPLY or TGT CONTINUE. TGT CONTINUE occurs with the occurrence of WINDOW and HOLDOK and AGEOK and MISSOK. HOLDOK occurs by the occurrence of HOLD-LT or HOL-DET-EQG. AGEOK occurs upon the occurrence of AGE-LT or the simultaneous occurrence of AGE-EQG and HOLD-DET-EQG. MISSOK occurs upon the occurrence of MISS-LT.

Reply FIFO 74 will dump its contents (i.e. be read from) upon the occurrence of NOT WINDOW and REPLY AVAILABLE and the range count value of range counter 92 being less than the range value of a reply as determined by range comparator 94.

FIGS. 6–14 illustrate one implementation of controller 100 satisfying the above requirements of controller 100. The operation of the beacon fruit pre-filter 40 is described below. In FIG. 1, the HOLD value is 5. When a new reply is designated as an initial reply, the counters in count aging circuit 102 are reset, with the AGE and HOLD interval counters 302 and 304 being reset to 1 (The first interval has already occurred, so the count value would be $0+1=1$). When an initial reply is received, count aging circuit 102 does not increment the detection count, since detection count is keeping track of new correlated replies. When the next PRT interval occurs, if no correlated new reply arrives, then the AGE interval counter 302 and HOLD interval counter 304 are incremented to 2. If the HOLD interval counter increments to 5 without a correlated new reply, the initial reply is discarded as fruit. If a new reply does correlate with the initial reply within the HOLD window, the HOLD detection threshold value of 2 is met, and the AGE window takes over. If the AGE interval counter 302 reaches 10 (the AGE value in FIG. 1) before the AGE detection threshold M (e.g., $M=4$) is reached, then the initial reply is discarded as fruit.

Count evaluation circuit 76 receives the stored count values from reply memory 74. Based on the received number of counts, count evaluation means 76 triggers the discarding of fruit, the determination of the replies as being target replies, etc. For example, if count evaluation circuit 76 receives indication from reply memory 74 that an initial reply has been received, then count evaluation circuit forwards this information to controller 100 Controller 100 then sends out a multiplexer control signal to input multiplexer 72 to allow the initial reply to be stored in reply memory 74 as an initial reply, setting the counters and count aging circuit 102 as noted above.

If an initial reply which correlates with a new reply exists in reply memory 74, this is detected by count evaluation circuit 76, and controller 100 outputs a multiplexer control signal to output multiplexer 82. Output means 82 is then enabled, allowing the replies, both initial and new, to be output to an output memory 84 where it is passed on to the data processing system. If prior replies have been received which correlate with the decoded reply data, then, as noted above, the data is sent directly to output multiplexer 82. In output multiplexer 82, all replies correlating to this reply are channeled into output FIFO 84. Output FIFO 84 comprises a series of storage registers. The replies are forwarded from the output FIFO 84 to the data processor 60 for processing by the ATC system.

Reply memory 74 must be large enough to handle the number of target replies and fruit replies which could potentially be received over the beam width of the radar, typically a 250 nautical mile range. A 2K FIFO will store approximately 2K replies, which is sufficient to store the replies received over the 250 nautical mile range. This large size is required because the replies are not discarded until a large enough interval has been inspected to decide whether or not the reply is a fruit reply or a desired reply.

Assuming that no prior reply correlating to the received reply has been stored, the new reply is stored into the reply memory 74 and is read out during succeeding intervals. If an initial reply is received and a second reply is received before the HOLD window has elapsed, then the system reverts to the AGE window inspection.

The pre-filter performance has been analytically modeled to assess the fruit rejection capability and the detection loss imparted to real targets. There is a small probability of discarding a real target (or at least its leading edge in azimuth) and the amount varies with the size of the HOLD window.

The range proximity window of approximately 1 μs (0.935 μs) was selected to provide a window large enough to encompass the peak to peak timing, jitter and noise errors that occur in a typical beacon system. For a 40,000 fruit/second rate the probability of a fruit occurrence in a given window is (1) $P(fruit) = 40,000 * 0.935 \times 10^{-6} = 0.0374$ The probability of rejecting a fruit reply (only one reply in HOLD windows) is (2) $P(reject) = P(fruit) * ((1 - P(fruit))^{HOLD-1}$ Using the above probability of fruit occurrence, equation 2 is solved for various values of HOLD. The results are presented in Table 1.

TABLE 1

| Hold | P (reject) | Ratio of Fruit Deleted |
|---|---|---|
| 2 | 0.036001 | 0.963 |
| 3 | 0.03466 | 0.9266 |
| 4 | 0.03336 | 0.8919 |
| 5 | 0.0321 | 0.8586 |
| 6 | 0.03091 | 0.8265 |
| 7 | 0.02975 | 0.7956 |
| 8 | 0.02864 | 0.7658 |
| 9 | 0.0276 | 0.7372 |
| 10 | 0.002654 | 0.7096 |

Thus for a HOLD interval of 5, approximately 86% of all fruit replies are discarded. The smaller HOLD is set, however, the greater the impact on the real target detection probability. Even for a HOLD window of 10, only 30% of the fruit leaks through the filter.

The effects upon the real target detection probability was checked by enumerating all the possible ways that a detection could occur but be lost due to the HOLD interval filter (1 target reply occurring in HOLD intervals, followed by a sequence that will achieve a detection). The Pd loss can be approximated by the following equations:

$$Pd\ Loss = D_T + D_T * \sum_{Z=0}^{M} P_M P_H * D_T \quad (3)$$

where:
M = RL − AGE − HOLD − K $M = RL - AGE - HOLD - K$ $D_T = P_H^{HOLD-1} * \frac{(AGE - HOLD)}{n-1} * P_H^{N-1} * P_M^{AGE-HOLD-(n-1)}$ $P_H$ = probability of a target reply
$P_M = (1 - P_H)$
M = detection threshold
RL = target azimuth runlength Equation (3) has been solved below for a variety of situations. For a selected HOLD=5 and $P_H$=0.76, M=4, AGE=11, K=0 to (RL−M), the results obtained are presented in Table 2.

TABLE 2

TARGET PD LOSS DUE TO BEACON FILTER

| Target Runlength (RL) | Pd Loss (HOLD = 5) | Pd Loss (HOLD = 2) |
|---|---|---|
| 4 | 0 | 0.0769 |
| 5 | 0 | — |
| 6 | 0 | 0.0175 |
| 7 | 0 | — |
| 8 | 0 | — |
| 9 | 0.000265 | — |
| 11 | 0.000266 | — |
| 12 | 0.000266 | 0.0187 |
| 15 | 0.000266 | — |
| 16 | 0.000267 | 0.0189 |
| 22 | 0.000267 | 0.0189 |
| 23 | 0.000267 | — |
| 30 | 0.000267 | 0.0189 |

As can be seen for a HOLD=5, there is negligible detection loss for a wide range of target size. For a HOLD=2, there is considerable detection loss as noted.

While the above description relates to a hardware implementation of the beacon fruit pre-filter, the beacon fruit pre-filter can be implemented by software as well.

The many features and advantages of the present invention are apparent from the detailed specification and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A pre-filter for removing fruit replies from decoded reply data prior to being output for processing in a radar system, comprising:
- detecting means for detecting reply signals occurring in a plurality of time periods;
- counting means for counting a number of related reply signals occurring in a first predetermined number of said time periods and for counting a number of related reply signals occurring in a second predetermined number of said time periods, said second predetermined number being greater than said first predetermined number;
- memory means for storing the reply signals detected by said detecting means;
- comparing means for comparing the number of related reply signals occurring in said first predetermined number of said time periods with a first threshold value and for comparing the number of related reply signals occurring in said second predetermined number of said time periods with a second threshold value; and
- control means for discarding a reply signal stored in said memory means when a number of related replies occurring in said first predetermined number of time periods is below said first threshold value, for outputting from said pre-filter related reply signals stored in said memory means when a number of related reply signals occurring in said first predetermined number of time periods is equal to or greater than said first threshold value, for discarding related replies stored in said memory means when a number of related replies occurring in said second predetermined number of time periods is below a second threshold value, and for outputting from said pre-filter related replies stored in said memory means when a number of related replies occurring in said second predetermined number of time periods is equal to or greater than said second threshold value.

2. A prefilter as recited in claim 1, wherein said detecting means comprises a beacon reply processor.

3. A prefilter as recited in claim 1, wherein said counting means comprises:
- first time period counting means for counting the number of time periods, said first time period counting means incrementing upon the occurrence of each time period;
- second time period counting means for counting the number of time periods, said second time period counting means incrementing upon the occurrence of each time period;
- related reply signal counting means for counting related reply signals;
- miss counting means for counting successive misses.

4. A prefilter as recited in claim 3, wherein said memory means comprises a 2 k FIFO memory.

5. A prefilter as recited in claim 3, wherein said comparing means comprises:
- first count comparing means for comparing the number of time periods counted by said first time period counting means with a third threshold value and outputting a first logic signal if the number of time periods counted by said first time period counting means is less than the third threshold value, and outputting a second logic signal if the number of time periods counted by said first time period counting means is greater than or equal to said third threshold value.

6. A prefilter as recited in claim 5, wherein said comparing means further comprises:
- second count comparing means for comparing the number of time periods counted by said second time period counting means with a fourth threshold value and outputting a first logic signal if the number of time periods counted by said second time period counting means is less than said fourth threshold value, and outputting a second logic signal if the number of time periods counted by said second time period counting means is equal to the fourth threshold value.

7. A prefilter as recited in claim 6, wherein said comparing means further comprises:
- first related reply signal comparing means for comparing the number of related reply signals occurring in said first predetermined number of said time periods counted by said counting means with said first threshold value and outputting a first logic signal if the number of related reply signals occurring in said first predetermined number of said time periods is less than said first threshold value, and outputting a second logic signal if the number of related reply signals occurring in said first predetermined number of said time periods is greater than or equal to said first threshold value.

8. A prefilter as recited in claim 7, wherein said comparing means further comprises:
- second related reply signal comparing means for comparing the number of related reply signals occurring in said second predetermined number of said time periods counted by said counting means with said second threshold value and outputting a first logic signal when the number of related reply signals occurring in said second predetermined number of said time periods is less than said second threshold value, and outputting a second logic signal when the number of related reply signals occurring in said second predetermined number of said time periods is equal to or greater than said second threshold value.

9. A prefilter as recited in claim 8, wherein said comparing means further comprises:
- miss comparing means for comparing the number of successive misses counted by said miss counting means with a fifth threshold value, and outputting a first logic signal if the number of successive misses counted by said miss counting means is less than said fifth threshold value, and outputting a second logic signal if the number of successive misses counted by said miss counting means is equal to said fifth threshold value.

* * * * *